United States Patent [19]

Belmares

[11] Patent Number: 4,954,591

[45] Date of Patent: Sep. 4, 1990

[54] ABRASION RESISTANT RADIATION CURABLE COATING FOR POLYCARBONATE ARTICLE

[75] Inventor: Hector Belmares, Petaluma, Calif.

[73] Assignee: Pilkington Visioncare Holdings, Inc., Menlo Park, Calif.

[21] Appl. No.: 118,116

[22] Filed: Nov. 6, 1987

[51] Int. Cl.$^5$ ............................................. C08F 26/08
[52] U.S. Cl. ................................ 526/264; 522/96; 522/167; 522/183; 526/270; 526/314
[58] Field of Search ............... 522/167, 183; 526/264, 526/270, 314

[56] References Cited

U.S. PATENT DOCUMENTS

| | | | |
|---|---|---|---|
| 4,199,421 | 4/1980 | Kamada et al. | 522/168 |
| 4,217,433 | 8/1980 | Dyball | 525/277 |
| 4,291,097 | 9/1981 | Kamada et al. | 428/412 |
| 4,319,811 | 3/1982 | Tu et al. | 351/166 |
| 4,373,076 | 2/1983 | Tarumi | 526/261 |
| 4,424,314 | 1/1984 | Barzynski et al. | 522/167 |
| 4,496,686 | 1/1985 | Ansel | 526/314 X |
| 4,600,649 | 7/1986 | Leo | 428/412 |
| 4,622,376 | 11/1986 | Misura et al. | 526/314 X |

FOREIGN PATENT DOCUMENTS

| | | |
|---|---|---|
| 0071475 | 2/1983 | European Pat. Off. ............ 526/314 |
| 0194986 | 9/1986 | European Pat. Off. . |
| 85-17409 | 1/1985 | Japan . |
| 0092306 | 5/1985 | Japan ................................ 526/314 |
| 1247711 | 11/1986 | Japan ................................ 526/314 |
| 2082606 | 3/1982 | United Kingdom . |
| 2144345 | 3/1985 | United Kingdom . |
| 2176794 | 1/1987 | United Kingdom . |

OTHER PUBLICATIONS

J. Zhang et al., "Investigation of the Mass Diffusion of Camphorquinone in Amorphous Poly(methyl methacrylate) and Poly(tert-butyl methacrylate), Hosts by the Induced Holographic Grating Relaxation Technique", *Macromolecules*, 1986, 19, 1390–1394.

J. Coutandin et al., "Duiffusion of Dye Molecules in Polymers Above and Below the Glass Transition Temperature Studied by the Holographic Grating Technique", *Macromolecules*, 1985, 18, 587–589.

*Primary Examiner*—Joseph L. Schofer
*Assistant Examiner*—J. M. Reddick
*Attorney, Agent, or Firm*—Townsend & Townsend

[57] ABSTRACT

Polymerizable and cross-linkable, radiation curable coating compositions particularly designed for deposition as an abrasion resistant, tintable coating poly (bis phenyl A) carbonates. The formulation is a mixture including:

(a) 25–94% by weight of a polyfunctional acrylate or methacrylate monomer having at least three acrylate functional groups per molecule or a mixture of such monomers;

(b) 3–50% by weight of a monomer selected from N-vinyl derivatives of linear or cyclic secondary amides, tetrahydrofurfuryl acrylate or methacrylate, N,N-di(lower alkyl) acrylamide ethylenically unsaturated monosilane, or a mixture of such monomers; and (c) 3–40% by weight of an ethylenically unsaturated monomer having a Tg less than 80° C. or 3–30% of an ethylenically unsaturated copolymer with a Tg less than 100° C.

11 Claims, No Drawings

ABRASION RESISTANT RADIATION CURABLE COATING FOR POLYCARBONATE ARTICLE

TECHNICAL FIELD

The invention relates to radiation curable coating compositions for polycarbonate articles, such as ophthalmic lenses. In particular the invention relates to coating compositions which are tintable after curing to their final hardness.

BACKGROUND ART

Polycarbonate articles have a good impact resistance and transparency, but suffer from a poor resistance to scratching or solvent attack. To remedy this it has been proposed to coat the surface of a polycarbonate article with a thin coating of abrasion resistant material. To obtain good adhesion most of these coatings require the use of a primer layer which is applied to the polycarbonate before the coating operation is performed. While such coatings have adequate adhesion properties for many purposes, they are not generally resistant to immersion in boiling water. Furthermore the use of a primer layer is an additional process step and adds considerably to the cost and complexity of the coating process.

Several coatings have therefore been proposed for direct application to polycarbonate articles:

U.S. Pat. No. 4,600,649 describes a radiation curable abrasion resistant coating which adheres strongly to basic plastic surfaces (polycarbonate is cited as an example). The coating contains one or more polyacrylates or methacrylates containing at least 2.4 unsaturated groups per molecule and a carboxylic acid which contains acrylic or methacrylic unsaturation. A preferred polyacrylate is trimethylol propane triacrylate. Some diacrylates can also be included in the mixture. Isobornyl acrylate may be present in small amounts to enhance rapid radiation cure, flexibility and to enhance the liquidity of the composition or one of its components. Acrylic acid is a preferred carboxylic acid.

U.S. Pat. No. 4,319,811 and European patent application No. 0194986 both suggest radiation curable coatings formed by co-polymerization of an acrylate with three or more acrylate functional groups per molecule and a monomer containing an N-vinyl imido group. The preferred N-vinyl imido group containing monomer is N-vinyl pyrrolidone. The use of N-vinyl pyrrolidone to provide a coating which adheres well to polycarbonate is further exemplified in G.B. patent applicationNo. 2,082,606A. This patent suggests that acrylates with only two functional groups can be used in conjunction with a cross-linker, and suggests that any N-vinyl derivative of a linear or cyclic secondary amide can be used in place of N-vinyl pyrrolidone.

U.S. Pat. No. 4,199,421 uses a copolymer of acrylate or methacrylate with three or more functional groups per molecule, poly(meth)acrylates of mono or polypentaerythritol being preferred, and either tetrahydrofurfuryl(meth)acrylatr ethyl carbitol(meth)acrylate to form a radiation cured abrasion resistant coating. U.S. Pat. No. 4,291,097 says that while such coatings have an excellent abrasion resistance and surface smoothness, they are likely to be readily staticized so as to attract and deposit dust or the like and have been difficult to dye. U.S. Pat. No. 4,291,097 suggests that the further addition of a phosphate type monomer and an ethanolamine compound can substantially improve the antistaticity and dyeability of the coating while maintaining the desirable abrasion resistance and surface smoothness. The coatings are apparently suitable for polycarbonate and the hardened coating is said to be tintable by almost all types of dyes. The examples use a dye bath at 90° C. for 1 hour which may be due to the coating's poor resistance to immersion in boiling the coating water. In any case 1 hour is a relatively long exposure to the tinting bath.

G.B. patent application No. 2,144,345A suggests that the composition of U.S. Pat. No. 4,319,811 can be rendered hard and yet still tintable by curing to achieve between 20 and 80% cross-linking. In fact the tintable coating achieved by this technique is not hard enough for practical applications and must be subjected to a second curing step after tinting. This is extremely inconvenient.

None of the prior art abrasion resistant coatings has been able to combine the desirable features of radiation curing, direct application to polycarbonate, adhesion sufficient to withstand prolonged exposure to boiling water and tintability when in the fully hardened state.

Throughout this patent specification the term "light tint" is used to denote a lens which transmits between 75% of the incident light and 88% which is the transmittability of an uncoated, untinted polycarbonate lens. The term "strong tint" embraces tinted lenses with a transmission in the range 40 to 75%. "Tintable" means capable of being tinted to give a light or strong tint, as required.

SUMMARY OF THE INVENTION

I have discovered a wide range of radiation curable coating compositions for polycarbonate articles which are tintable after curing to their final hardness. The coating compositions are primarily intended for use with poly (bis phenol A) carbonates and blends thereof. The coating compositions comprise a mixture of three or more monomers or polymers which form a randomly cross-linked structure when exposed to radiation in the presence of a photo-initiator as a catalyst. To impart hardness to our coatings I select an acrylate or methacrylate (A) having three or more acrylate functional groups per molecule.

All tri- and higher functionality acrylates and methacrylates are contemplated such as the "common" triacryalates shown in the above cited prior art (see U.S. Pat. No. 4,319,811) as well as the newer tetra and hexacrylates (and corresponding methacrylates) of the following types:

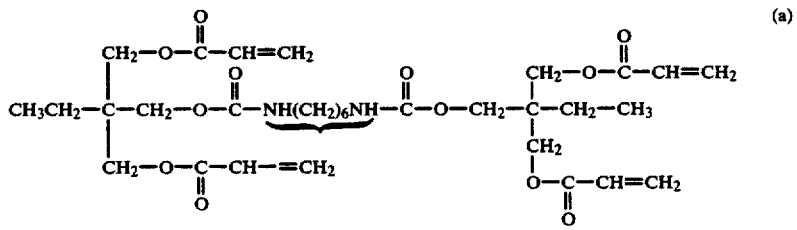

(a)

viscosity = 13,500 lps
functionality = 4

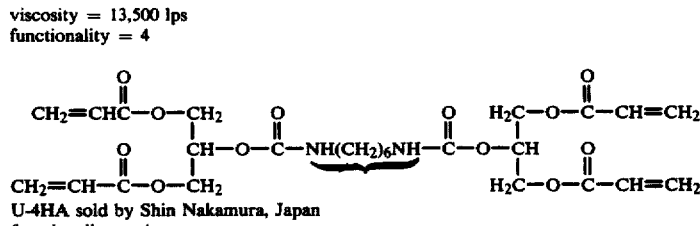

(b)

U-4HA sold by Shin Nakamura, Japan
functionality = 4

Obtained by condensation of two moles of glycerin diacrylate with one mole of hexamethylendiisocyanate. Very similar to the (a) compound.

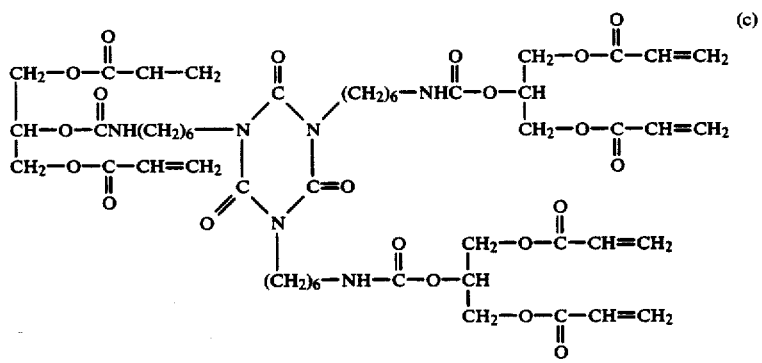

(c)

U-6HA Sold by Shin Nakamura, Japan
functionality = 6

Obtained by condensing hexamethylenediisocyanate in the presence of water to give trimer and then condensing trimer with three moles of glycerin diacrylate.

All of these acrylates and methacrylates can be used alone or mixed in any desired proportion with the "common" tri-and higher functionality-acrylates and methacrylates to form the "hard phase."

Acrylates are preferred as they generally give a harder coating. However, methacrylates were selected for many of the examples because they are less irritant and allergenic. Methacrylates also confer some tintability due to the so called "free volume effect" which has been described for other systems in "Macromolecules 1986, 19, 1390-1394" and "Macromolecules 1985, 18, 589, 590". This effect is a complex relationship between dye diffusion and the glass transition. temperature (Tg) of a polymer. It is most pronounced when bulky pendant groups are present. The methyl group in methacrylates is thought to give rise to enhanced tintability by operation of this effect. Nevertheless this enhancement is not sufficient to produce a truly tintable coating.

To the "hard" polyfunctional(meth)acrylate monomer is added a monomer (B) capable of interpenetrating a polycarbonate substrate. A typical example is a lactam such as vinyl pyrrolidone or its equivalent. Known equivalents are other N-vinyl derivatives of linear or cyclic secondary amides. N,N di(lower alkyl)acrylamides and tetrahydrofurfurylacrylates or methacrylates. Those skilled in the art will appreciate that other known monomers with vinyl groups could be substituted for these. I have successfully used an ethylenically unsaturated mono silane.

The main function of monomer B is to form an interpenetrating network with the polycarbonate. This interpenetration causes the polymerized coating to be anchored firmly to the polycarbonate so that it can survive prolonged exposure to boiling water, which is useful if it is to be tinted in a conventional tint bath. Monomer B is chosen to be compatible with the polycarbonate in both its monomeric and polymeric phases. If the interaction between monomer B and the polycarbonate is too strong, phase separation occurs at the interface and the finished product is hazy. This can be prevented by combining monomer B with an ethylenically unsaturated processing aid such as isobornyl acrylate.

Advantageously monomer B is selected from the group comprising: N-vinyl pyrrolidone, N-vinyl caprolactam. N-vinyl-N-methyl acetamide, N-vinyl-N-methyl propionamide, N-vinyl-N-ethyl propionamide, N,N dimethyl acrylamide, tetrahydrofurfurylacrylates or methacrylates and a mono silane. Mono silane means a silane having only one silane moiety, a vinyl group and three lower alkoxy groups, being methoxy or ethoxy groups. Such a mono silane is gamma-methacryloxypropyltrimethoxysilane.

The following are useful examples of tetrahydrofurfurylacrylates and methacrylates:

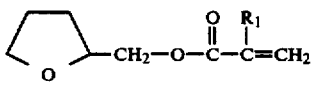

in which $R_1$ represents a hydrogen, chlorine or bromine atom or a methyl group.

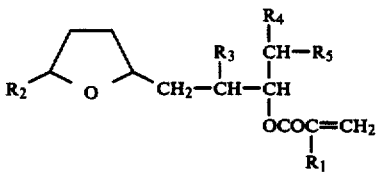

in which $R_1$ $R_2$ represents a hydrogen atom or a methyl group; $R_3$ a hydrogen atom or a methyl or ethyl group; $R_4$ a hydrogen atom, a methyl, ethyl or isopropyl group: $R_5$ a hydrogen atom. There compounds are prepared (and are useful as reactive diluents for photocurable compositions) after the teachings of Japanese patent application No. 85/17,409.

To obtain the required tintability we add ethylenically unsaturated monomer or copolymer (C.). For a monomer we have found that the glass transition temperature, Tg, should be less than BO° C.; for a copolymer it can be a little higher but should still be less than 100° C. The cured coating can be tinted relatively quickly by conventional water dispersion dyes. The dyeing mechanism is not fully understood, b%t it is thought that heating to 100° C. or thereabouts causes the coating to undergo a "popcorn" effect due to the softening of component C. This creates a "free volume". which together with the dye compatability induced by selection of a weakly hydrophobic component C. allows the dye to penetrate the coating and either be retained within the coating or pass through to the polycarbonate.

Preferred monomers for component C are:

(1) Polyethylene glycol bis (allyl carbonates). such as diethyleneglycol bis(allyl carbonate)(CR-39%) of the formula:

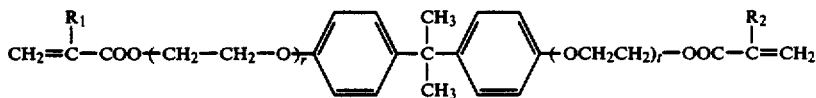

from n = 2(CR-39) to n = 25 preferably from n=2 to n=g and most preferably n=2 to n=3.

(2) Polyethylene glycol diacrylate and dimethacrylate esters of the formula:

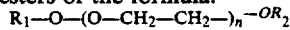

in which $R_1 = R_2$ or $R_1 \neq R_2$ and

and $R_3$ represents a hydrogen, chlorine or bromine atom or a methyl group. The n represents an integer of 2 to 25. preferably 2 to 9. Examples include dimethylene glycol dimethacrylate (example 48), triethylene glycol dimethacrylate (example 49), tetraethylene glycol dimethacrylate (example 50). polyethylene glycol 400 diacrylate (n=9, example 19).

(3) Polyethylene glycol methacrylates or acrylates and polypropylene glycol methacrylates or acrylates of the formulas:

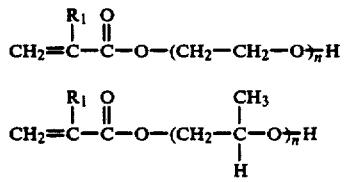

in which n=2 to 25, preferably 2 to 9 and $R_1$ represents a hydrogen atom or a methyl group, preferably a methyl group. Examples include polypropylene glycol monomethacrylate (n=5, example 22; and n=6. example 23).

(4) Bis-Phenol A derivatives represented by the following formula:

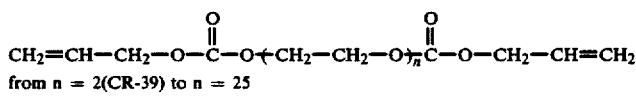

wherein $R_1$ and $R_2$ independently from each other, represent a hydrogen, chlorine or bromine atom or a methyl group, and r and t, independently from each other, is 0, 1, 2. or 3. Specific examples include $R_1=R_2=-CH_3$ and r=t=1 (example 18).

(5) Copolymers having a molecular weight of 1,000 to 20,000 preferably 3,000 to 8,000 of (prepared after teachings of U.S. Pat. No. 5,217,433):

at least one allyl ester of an 50 —β unsaturated carboxylic acid or an allyl substituted monovinyl aromatic compound;

at least one lower alkyl methacrylate, optionally together with variable, usually lesser amounts of one or more vinyl monomers or acrylates. (Examples 17. 44–46)

(6) Isobornyl acrylate (IBOA) increases tintability due to the free volume effect. The same function is performed by norbornyl acrylates and methacrylates of the formula:

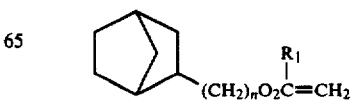

in which $R_1$ represents a hydrogen atom or a methyl group. n=0.1.

(7) Monomers represented by the formula:

wherein $R_1$ represents a hydrogen atom or a methyl group. $R_2$ represents a polycyclic aliphatic hydrocarbon group. n is 0, 1, 2, or 3. The polycyclic aliphatic hydrocarbon carbon group represented by $R_2$ is a monovalent aliphatic hydrocarbon group containing a plurality of alicyclic rings. The alicyclic rings preferably form a fused ring having at least two ring members in common rather than existing independently from each other. The polycyclic aliphatic hydrocarbon group may include a chain hydrocarbon moiety in addition to such a ring. Such a polycyclic aliphatic hydrocarbon group may generally contain 7 to 30 carbon atoms, preferably 7 to 25 carbon atoms. Specifically, the following groups may be cited as examples:

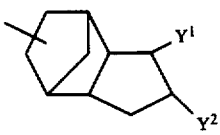

wherein $Y^1$ and $Y^2$ each represent a hydrogen, chlorine or bromine atom or a lower alkyl group, or together form an additional bond.

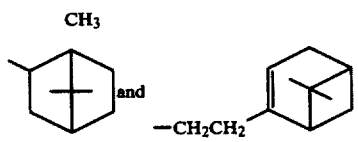

In the present specification and claims, the term "lower" used to qualify an atomic grouping or a compound means that the atomic grouping or compound so qualified contains not more than 6 carbon atoms, preferably not more than 4 carbon atoms.

These monomers are described, for example, in G.B. Patent application No. 2,176,794A, and are known per se.

Preferred co-polymers for component C are a co-polymer of allyl methacrylate with methyl methacrylate having a number-average molecular weight of 5000.

In general the components A. B and C are combined so that the polyfunctional acrylate or methacrylate monomer component A constitutes 25-94% by weight of the composition. The interpenetrating component B of the formulation constitutes 3-50% by weight thereof, and the tintable component C constitutes 3-40% by weight of the composition. In the preferred embodiment a polymerization moderator, such as isobornyl acrylate, is included and the weight relationships in percent by weight are:

Component A 70-90

Component B 3-7

Component C 7-13

Moderator 3-7

The coating composition can be applied to a polycarbonate article such as an ophthalmic lens by any known coating technique. The coating is then cured by exposing it to radiation for a fraction of a second. The coated article obtained thereby is sufficiently hard for most purposes and requires no further hardening step for normal day-to-day use. Polycarbonate articles coated with such novel compositions can be tinted by a tinting process which it has not hitherto been possible to utilize with coated polycarbonate articles. Such a tinting process involves prolonged exposure to boiling water-based tinting dyes The use of such tinting processes has virtually no effect on the adhesion of the coating to the lens, because of the existence of the interpenetrating network. The co-polymer structure of the coating enables it to be tinted both evenly and deeply.

DESCRIPTION OF THE PREFERRED EMBODIMENT

The coating compositions described in the Examples were applied to bis phenol A polycarbonate lenses. The preferred technique for coating the lenses to give a coating thickness of 1 to 5 microns uses known spin coating techniques. To facilitate this spin coating the viscosity of the coating compositions should preferably be reduced to around 30 cps or less, generally less than 70 cps. The preferred technique for lowering the viscosity is to add monomers of low molecular weight which would contribute either to an interpenetrating network or to the tintability of the final coating. Optionally a solvent such as ethyl cellosolve was added before spin coating. This solvent should usually be evaporated before radiation curing takes place. Alternatively dip coating may be used to coat exceptionally viscous coating compositions onto the polycarbonate. Those skilled in the art will readily appreciate that the method of coating chosen for these examples was selected for convenience rather than necessity and that in practice any method such as spin. dip, spray or flow coating known in the art could be used to obtain coatings according to this invention.

As previously stated the desired thickness for a coating is in the range 1 micron to 5 microns and the spin speed is therefore chosen to give a coating within this range. It will be appreciated that more viscous coating compositions will require a higher spin speed to obtain the same coating thickness. We have found that coatings which exceed 5 microns in thickness tend to be highly stressed due to the greater degree of cure near to the surface in comparison to the center of the coating. This stress is continually seeking to make the coating peel off the polycarbonate substrate, and this is especially apparent when the coated lens is subjected to boiling water.

For many of the examples I selected the radiation curable GAFGARD 233. a material sold by the GAF Corporation and described in U.S. Pat. No. 4,319,811. The precise composition of GAFGARD is secret but G.B. patent application No. 2,144,345A advances a tentative composition of pentaerythritoltriacrylate (PETA) and N-vinyl pyrrolidone (VP) in a weight ratio of about 80% to 20% respectively. It is also said to contain a suitable photo initiator. GAFGARD 233 is sold as a 100% solid but at 95 cps its viscosity at 25° C. is too high for spin or dip coating. Addition of more VP and the low glass transition temperature monomers or copolymer not only lowers the viscosity but leads to formation of an interpenetrating network with the polycarbonate and permits dyeing of the abrasion resistant coating formed when cured. I have found that it is necessary to add extra initiator to the GAFGARD 233. The lower the reactivity of the diluent monomers the more extra initiator is needed. Care must be exercised as too much initiator may act as a plasticizer by initiating many small chains which will not grow properly. This will result in an unacceptably soft final coating. I have found that it is a fairly simple matter to determine the correct amount of initiator by trial and error.

The formation of an interpenetrating network with the polycarbonate requires a balance to be struck between the spread of the uncured coating over the surface of the polycarbonate and the speed and depth of penetration by Component B into the polycarbonate. If the interaction is too strong a moderator must be incorporated in the coating. The moderator must be able to form part of the randomly cross-linked coating when radiation cured. Isobornyl acrylate has been found to produce the required moderation to enable satisfactory spin coating to take place.

The spin coated polycarbonate lenses are cured under nitrogen in a conveyorised ultra violet lamp system at a conveyor speed ranging between 5 and 100 feet per minute. The ultra violet radiation is supplied by a 6-inch 200 watt-per-inch electrodeless medium-pressure mercury lamp. The coated lens is generally radiated at least once from each side and normally twice from each side at belt speeds determined by simple experiment to obtain an optimum cure. We have found that for the majority of our coating compositions the degree of tintability decreased steadily as the degree of cure is increased whereas the abrasion resistance is increased up to a point and then increases only very slowly after a certain degree of cure has been passed. By careful selection of our coating compositions and experimental determination of the point of inflection for abrasion resistance we are able to obtain coatings which tint to the required degree and have the required abrasion resistance.

The resistance of the coated lens to abrasion was measured with a Taber Abrasion-meter having CSIOF grinding wheels, according to ASTM-D1044. The equipment was modified to be able to test lenses having curved surfaces. The abrasion wheels were roughed up every 1000 cycles and loaded with 500 g. A determination of the extent of abrasion was carried out by an optical method, namely the ASTM 1003 Haze test. The results obtained for various cycles of treatment. e.g.. 50. 200. 500. are given in relation to each example below.

Coated lenses were dyed in a conventional tint bath using water dispersed dye-stuffs which are commonly in use in the ophthalmic industry such as the Brain Power Inc. (BPI) brand. The existence of interpenetrating networks allowed the use of tint baths containing boiling water, which contributed to the excellent tinting obtained in many of these tests.

I have found that cross-hatch adhesion testing is not a sufficient indication of how well the coated polycarbonate article would withstand the rigors of daily use. I prefer instead to subject the article to prolonged exposure to boiling water and to thermal shocking by cycling between boiling water and cold water. The interpenetrating networks gave rise to outstanding resistance to boiling water exposure and to thermal shocking.

The following examples illustrate but do not limit the invention.

COMPARATIVE EXAMPLE A

An uncoated bis phenol A polycarbonate lens was tested for Taber hardness. Haze at 200 cycles was established to be 50% and at 500 cycles 65%. The lens was exposed to a boiling water tint bath containing a water dispersing dye recommended for use with CR39: such as the BPI brand. It was inspected after 10 minutes and after 1 hour, it was found to be totally untintable.

COMPARATIVE EXAMPLE B

A polycarbonate lens such as that used in comparative Example A was spin coated with trimethylolpropanetrimethacrylate (TMPTMA):

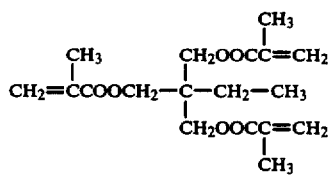

TMPTMA together with four parts per hundred of a photo initiator. The photo initiator chosen was Darocur 1173 which is a benzointype alpha-clevage photo initiator. It is unnecessary to use hydrogen abstraction type photo initiators when cure is being effected in an inert atmosphere. Darocur 1173 is manufactured by E.M. Industries Inc. Its chemical composition is 2-hydroxy. 2-methyl, 1-phenylpropane-l-one dimethoxy-2-phenylacetophenone. Other suitable initiators include Irgacure 651 and 184(Ciba-Geigy) and DEAP (Upjohn). After curing tests were performed to determine the Taber Hardness, the tintability, and the adhesion after-exposure to boiling water for one hour. The Haze value obtained by Taber testing after 200 and 500 cycles together with the percent transmission after 10 minutes and 1 hour is given in Table 1. As expected this coating which contained only a radiation polymerizable polymethacrylate (Component A) failed to adhere sufficiently to withstand 1 hour in boiling water without starting to peel off the polycarbonate lens.

COMPARATIVE EXAMPLE C

The tests of Comparative Example B were repeated, but this time the commercially available GAF 233was spin coated onto a polycarbonate lens. This coating adhered satisfactorily even when exposed to boiling water for one hour. However, it was virtually untintable and even after immersion in the tinting bath for one hour its light transmission had only been reduced from 88% to 78%. The results for abrasion resistance and tintability are given in table 1. This demonstrates that a coating formed from a radiation polymerizable mixture of polyfunctional acrylates (Component A) and vinyl pyrrolidone (Component B) gives an abrasion resistant that a coating which adheres well, but which cannot be tinted to the required degree.

COMPARATIVE EXAMPLE D

Comparative Example C was repeated, but some extra vinyl pyrrolidone was added to the GAF. a higher spin speed was used and an extra 0.35 parts Darocur 1173 were added to the mixture. The coating adhered well and was abrasion resistant. Table 1 shows that the coating of 95 parts GAF; 5 parts VP was not tintable.

TABLE 1

TABLE 2

| | GAF + VP + Low Tg monomer | | | | | | | |
|---|---|---|---|---|---|---|---|---|
| Example | % GAF (A) | % VP (B) | Low Tg monomer (C) | Other | Part Darocur added | 200 cycles | 500 cycles | 10 min |
| 1 | 95 | | PU(5) | | 0 | 25 | 39 | 36 |
| 2 | 90 | | PU(10) | | 0 | — | 60 | 36 |
| 3 | 80 | 10 | CR39(10) | | 0.8 | 12 | 41 | 46 |
| 4 | 60 | 30 | CR39(10) | | 3 | 16 | 16 | 26 |
| 5 | 80 | 5 | CR39(10) | IBOA(5) | 1.5 | 4 | 28 | 41 |
| 6 | 70 | 10 | CR39(10) | IBOA(10) | 1.8 | 8 | 25 | 38 |
| 7 | 60 | 20 | CR39(10) | IBOA(10) | 2.4 | — | 25 | 28 |

| Comparative Examples | | | | |
|---|---|---|---|---|
| Comparative Example | 200 cycles | 500 cycles | 10 mins | 1 hour |
| A | 50 | 65 | — | — |
| B | 13 | 42 | 74.1 | 59.4 |
| C | 8 | 34 | 86 | 78 |
| D | 7 | 30 | 83 | 83 |

EXAMPLES 1-7

For these examples I selected the commercially available GAF 233D composition and added to it monomers of low glass transition temperature. For some of the examples I also added extra vinyl pyrrolidone (VP) to determine the effect that this had on the formation of an interpenetrating network. The compositions together with the amount of extra photo initiator used (if any) and the results for 200 and 500 cycle Haze are given in Table 2. together with tintability data for 10 minutes exposure to tinting solution. Example 1 used 5% of an aliphatic urethane acrylate (PU) (Chemlink 9503, 9504, or 95505) in combination with 95% by weight of GAF. Example 2 used 10% of the same urethane acrylate. Examples 3 and 4 show the effect of adding VP to GAF and diethylene glycol bis (allyl carbonate) (CR39). It was found that at very high concentrations of VP the interpenetrating network was so strong that phase separation occurred at the surface of the polycarbonate. This resulted in an unacceptable loss of optical clarity in the finished product. For this reason Examples 5-7 use a combination of VP and isobornyl acrylate to form the interpenetrating network. I found that the introduction of isobornyl acrylate modified the system so that it was brought into balance and the phase separation previously encountered with high concentrations of inter- penetrating substances did not occur. All these coating compositions adhere satisfactorily to the polycarbonate, even after exposure to boiling water for 1 hour.

EXAMPLES 8-16

For these examples I used the TMPTMA trimethacrylate in place of the polyacrylate GAF formulation. The relative proportions of TMPTMA VP and CR39 were varied. The effect that this had on abrasion resistance and tintability is shown in Table 3. All the coating compositions in Table 3 used 6% Darocur photo initiator and all gave satisfactory adhesion after exposure to boiling water for 1 hour. Examples 14 to 16 show the considerable effect that introduction of larger quantities of CR39 has on the tintability of the coating.

Examples 8 to 13 show that keeping constant the amount of CR39, the VP has an increased synergistic effect on the polymerization of TMPTMA (increased abrasion resistance) until VP reaches a 25% concentration. After this point, the abrasion resistance starts to fall. This synergism between multifunctional methacrylates and VP is well documented in the technical literature. A synergism between VP and CR39 is also apparent for tintability in which the action of CR39 is increased by increasing the proportion of VP.

TABLE 3

| | TMPTMA + VP + CR39 | | | | | | |
|---|---|---|---|---|---|---|---|
| Example | % TMPTMA (A) | % VP (B) | % CR39 (C) | 200 Cycles | 500 Cycles | 10 min | 1 hour |
| 8 | 80 | 10 | 10 | 13 | 40 | 59 | 47 |
| 9 | 75 | 15 | 10 | 13 | 42 | 52 | 39 |
| 10 | 70 | 20 | 10 | 18 | 27 | 42 | 29 |
| 11 | 65 | 25 | 10 | 16 | 24 | 28 | 15 |
| 12 | 60 | 30 | 10 | 20 | 21 | 14 | 8 |
| 13 | 40 | 50 | 10 | 30 | 31 | 0.6 | 0.5 |
| 14 | 70 | 25 | 5 | 26 | 31 | 52 | 39 |
| 15 | 55 | 25 | 20 | 23 | 22 | 5 | 2 |
| 16 | 35 | 25 | 40 | 34 | 28 | 1.1 | 0.8 |

EXAMPLES 17-27

Examples 17-27 show the effect of adding other monomers and copolymers to mixtures of TMPTMA and VP, with or without CR39. The compositions used and the Taber results and tinatbilities are given in Table 4. In each case the photo initiator used was 6 parts Darocur added to 100 parts mixture and all these coatings gave good adhesion after exposure to boiling water for 1 hour. Luchem is Luchem 946 a copolymer comprising 94% methyl methacrylate and 6% allyl methacrylate. SR348 has the following structure:

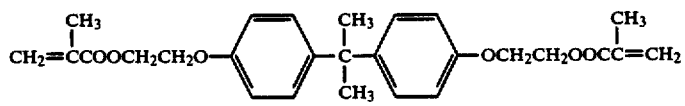

SR344 is polyethylene glycol 400 diacrylate. VA is vinyl acetate. Triam 606 is a hydrogenated diallylphthalate. PPM55 is a polypropylene glycol monomethacrylate with a 5 polypropylene glycol repeating units. PPM6E is a polypropylene glycol monomethacrylate with 6 polypropylene glycol repeat units. PU is a Chemlink 9503 aliphatic urethane acrylate. GPTA is a triacrylate of the formula:

TMPTMA to form the "Component A" part of the coating.

TABLE 4

| Example | % TMPTMA (A) | % VP (B) | % Others (C) | 200 Cycles | 500 Cycles | 10 min | 1 hour |
|---|---|---|---|---|---|---|---|
| 17 | 65 | 25 | Luchem(10) | 23 | 23 | 14 | 4 |
| 18 | 65 | 25 | SR348(10) | 22 | 28 | 55 | 32 |
| 19 | 65 | 25 | SR344(10) | 25 | 29 | 35 | 20 |
| 20 | 65 | 25 | VA(10) | 28 | 28 | 38 | 29 |
| 21 | 65 | 25 | Triam606(10) | 19 | 27 | 58 | 34 |
| 22 | 65 | 25 | PPM55(10) | 19 | 27 | 58 | 37 |
| 23 | 65 | 25 | PPM6E(10) | 15 | 29 | 48 | 29 |
| 24 | 65 | 25 | PU(5) | 31 | 36 | 13 | — |
| 25 | 32.5/GPTA(32.5) | 25 | CR39(10) | 21 | 27 | 30 | — |
| 26 | 30/GPTA(30) | 30 | CR39(10) | 21 | 26 | 11 | 2.5 |
| 27 | 30/GPTA(30) | 30 | CR39(10) | 22 | 34 | 70 | 43 |

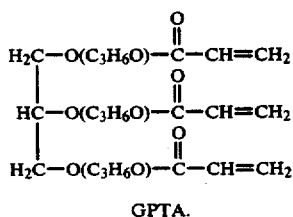

GPTA.

SR399 is a pentacrylate of the formula:

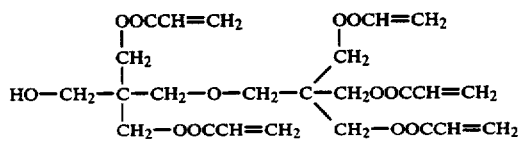

SR399.

It should be noticed that in Example 27 the addition of 30% of SR399 which is a pentacrylate markedly reduces the tintability of the coating. GPTA and SR399 are polyfunctional acrylates which combine with the

EXAMPLES 28-29

Example 28 was a coating composition comprising 63.6% TMPTMA, 27.3% gamma-methacryloxypropyltrimethoxysilane (MPTS), and 9.1% C9041an ethoxylated ester diacrylate. Example 29was 63.6% TMPTMA. 27.3% MPTS. and 9.1% PRO060 which is also an ethoxylated ester diacrylate. In each case the photo initiator was 6 parts Darocur added to the monomer mixture. All these compositions produced satisfactory adhesion, the Taber and tintability data is shown in Table 5. It can be seen that while there is little difference in the abrasion resistance imparted to the coating by the addition of the various acrylates making up Component C, the tintability is markedly better in the case of PRO60. Examples 28 and 29show that MPTS can be used to form an interpenetrating network instead of VP. Other alternative monomers that will form interpenetrating networks with the polycarbonate will be available to those skilled in the art. We have successfully used dimethylacrylamide (DMA) for example 30. and tetrahydrofurfuryl acrylate (SR-285) for example 31 and 32. In each case CR39was added to give tintability. Comparative example E shows that use of TMPTMA and SR-285 without any CR39 gives a non-tintable coating.

TABLE 5

| TMPTMA + Alternative IPN formers + Low Tg Monomers | | | | | | | |
|---|---|---|---|---|---|---|---|
| Component A | Component B | Component C | Parts Darocur added | 200 Cycles Haze | 500 Cycles Haze | 10 min tint | 1 hour tint |
| 28 TMPTMA(63.6) | MPTS(27.3) | C9041(9.1) | 6 | 27 | 53 | 54 | 37 |
| 29 TMPTMA(63.6) | MPTS(27.3) | PRO60(9.1) | 6 | 28 | 53 | 32 | 24 |
| 39 TMPTMA(65) | DMA(25) | CR39(10) | 6 | 32 | 28 | 36 (15 mins) | — |
| 31 TMPTMA(65) | SR-285(25) | CR39(10) | 6 | 24 | 47 | 42 | 32 |
| 32 TMPTMA(75) | SR-285(15) | CR39(10) | 6 | 20 | 48 | 61 | 51 |
| E TMPTMA(85) | SR-285(15) | — | 6 | 23 | 52 | 79 | 74 |

EXAMPLES 33-46

These examples show the results of using a coating composition having a variable percentage of TMPTMA, a variable percentage of MPTS and VP. and a monomer or polymer having a low or relatively low glass transition temperature. The precise formulations used together with Taber and tintability data are shown in Table 6. CR39 is diethylene glycol bis allyl carbonate, and Luchem is Luchem 946 which is a copolymer containing 94% methyl methacrylate and 6% allyl methacrylate. All the compositions had added 6 parts Darocur photo initiator. It was found that all these compositions have satisfactory adhesion and survived 1 hour boiling in water. It will be readily apparent that some of these compositions gave a very good combination of abrasion resistance and rapid tintability. These examples show that a combination of VP and MPTS can give rise to satisfactory adhesion by forming an interpenetrating network with the polycarbonate. It will be seen that example 37 contained a mixture of polyfunctional acrylates and polyfunctional methacrylates as Component A.

TABLE 6

| | | TMPTMA + (VP + MPTS) + Low Tg Monomers | | | | | | |
|---|---|---|---|---|---|---|---|---|
| Example | % TMPTMA | % MPTS | % VP | OTHER (%) | 200 Cycles | 500 Cycles | 10 min | 1 hour |
| 33 | 60 | 15 | 15 | PRO60(10) | 22 | 39 | 23 | 17 |
| 34 | 60 | 15 | 15 | SR348(10) | 25 | 45 | 34 | 22 |
| 35 | 60 | 15 | 15 | SR344(10) | 22 | 41 | 26 | 18 |
| 36 | 65 | 15 | 15 | SR344(5) | 22 | 39 | 36 | 24 |
| 37 | 30 (+GPTA(10) (+SR399(10) | 15 | 15 | C9040(10) PRO60(10) | 25 | 46 | 36 | 22 |
| 38 | 65 | 15 | 15 | CR39(5) | 20 | 41 | 37 | 25 |
| 39 | 65 | 15 | 10 | CR39(10) | 23 | 41 | 33 | 20 |
| 40 | 60 | 15 | 15 | CR39(10) | 22 | 37 | 27 | 17 |
| 41 | 60 | 10 | 20 | CR39(10) | 29 | 43 | 18 | 10 |
| 42 | 55 | 10 | 25 | CR39(10) | 18 | 24 | 12 | 6 |
| 43 | 50 | 10 | 30 | CR39(10) | 21 | 18 | 3 | 1 |
| 44 | 65 | 15 | 15 | Luchem(5) | 15 | 28 | 41 | 28 |
| 45 | 60 | 15 | 15 | Luchem(10) | 14 | 24 | 28 | 16 |
| 46 | 55 | 15 | 20 | Luchem(10) | 26 | 31 | 35 | 27 |

EXAMPLES 47-52

Example 47 is a repetition of example 5 using a higher spin coating speed and therefore obtaining a thinner, less easily tinted, coating. Example 48B replaces the CR39 with SR-231 which is diethyleneglycoldimethacrylate. Example 49 replaces the CR39 with SR-205. which is triethylene glycol dimethacrylate and Example 50 replaces the CR39 with SR-209. which is tetraethyleneglycoldimethacrylate. All these coatings combine good adhesion and abrasion resistance with tintability as can be seen from Table 7. SR-231. SR-205 and SR-209 are sold by ARCO.

Example 51 shows the effect of leaving the IBOA out of the mixture. The tintability and abrasion resistance shown in Table 7 is virtually the same as for example 47 which shows that for low concentrations of IBOA it is able to act as a processing aid without affecting the properties of the cured coatings. Example 52 shows that higher concentrations of IBOA enhance the tintability due to the free volume effect. Table 7 shows that the abrasion resistance decreases when higher concentrations of IBOA are used.

TABLE 7

| Component A | Component B | Component C | Other | Parts Darocur | 200 Cycle Haze | 500 Cycle Haze | 10 min tint | 1 hour tint |
|---|---|---|---|---|---|---|---|---|
| 47 GAF(80) | VP(5) | CR39(10) | IBOA(5) | 1.4 | 10 | 36 | 58 | 41 |
| 48 GAF(80) | VP(5) | SR-231(10) | IBOA(5) | 1.4 | 13 | 49 | 55 | 40 |
| 49 GAF(80) | VP(5) | SR-205(10) | IBOA(5) | 1.4 | 9 | 33 | 49 | 35 |
| 50 GAF(80) | VP(5) | SR-209(10) | IBOA(5) | 1.4 | 11 | 35 | 63 | 46 |
| 51 GAF(85) | VP(5) | CR39(10) | — | 1.05 | 9 | 37 | 59 | 42 |
| 52 GAF(73) | VP(5) | CR39(10) | IBOA(12) | 1.89 | 14 | 48 | 38 | 30 |

EXAMPLES 53-54

Table 8 shows the abrasion resistance of coatings having low concentrations of CR39 and VP and high concentrations of TMPTMA. Such coatings only exhibit slight tintability, but it is superior to coatings which do not contain CR39 or equivalent monomers with low Tg.

| A | B | C | Part Darocur added | 200 Cycle Haze | 500 Cycle Haze | Tint 1 hour |
|---|---|---|---|---|---|---|
| 53 TMPTMA(94) | VP(3) | CR39(3) | 6 | 21 | 50 | 72 |
| 54 TMPTMA(92) | VP(5) | CR39(3) | 6 | 23 | 49 | 72 |

What I claim is:

1. A polymerizable and cross-linkable, radiation curable coating composition for a polycarbonate article comprising a mixture of:
    (a) 25-94% by weight of a polyfunctional acrylate or methacrylate monomer having at least three acrylate functional groups per molecule or a mixture of such monomers;
    (b) 3-50% by weight of a monomer selected from N-vinyl derivatives of linear or cyclic secondary amides, tetrahydrofurfuryl acrylate or methacrylate, N,N-di(lower alkyl) acrylamide, ethylenically unsaturated monosilane, or a mixture of such monomers; and
    (c) 3-40% by weight of an ethylenically unsaturated monomer having a Tg less than 80° C. or 3-30% of an unsaturated monomer having a Tg less than 80° C. or 3-30% of an ethylenically unsaturated copolymer with a Tg less than 100° C., said monomer and copolymer being effective to impart tintability to the coating composition after it is cured.

2. A coating composition in accordance with claim 1, the components of said composition being present in the following percentages by weight:

| Component a | 70-90 |
|---|---|
| Component b | 3-7 |
| Component c | 7-13 | wherein component c includes a member selected from the group consisting of isobornyl acrylate, norbornyl acrylates and methacrylates of the formula:

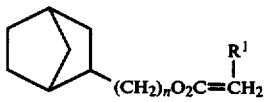

in which $R_1$ represents H or $CH_3$ and n is 0 or 1.

3. A coating composition in accordance with claim 1, wherein component a is an acrylate.

4. A coating composition in accordance with claim 3, wherein said acrylate is pentaerythritoltriacrylate.

5. A coating composition in accordance with claim 3, wherein said component b is vinyl pyrrolidone.

6. A coating composition in accordance with claim 5, wherein said component c is a polyethylene glycol bis(allyl carbonate).

7. A coating composition in accordance with claim 6, wherein said component c is diethylene glycol bis(allyl carbonate).

8. A coating composition in accordance with claim 2, wherein said component c includes isobornyl acrylate.

9. A coating composition in accordance with claim 7, the components of said composition being present in the following percentages by weight:

| Component a | 80 |
|---|---|
| Component b | 5 |
| Component c | 15 | wherein component c includes 5% of isobornyl acrylate.

10. A coating composition in accordance with claim 1, wherein said ethylenically unsaturated monomer of component c) is selected from (1) Polyethylene glycol bis(allyl carbonates), of the formula;

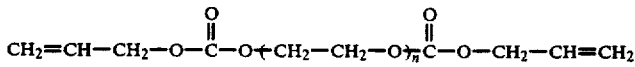

where n is from 2 to 9;

(2) Polyethylene glycol diacrylate and dimethacrylate esters of the formula:

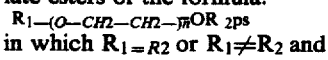

in which $R_1 = R_2$ or $R_1 \neq R_2$ and

where $R_3$ represents a hydrogen, chlorine or bromine atom or a methyl group, n represents an integer of 2 to 25;

(3) Polyethylene glycol methacrylates or acrylates and polypropylene glycol methacrylates or acrylates of the formulas:

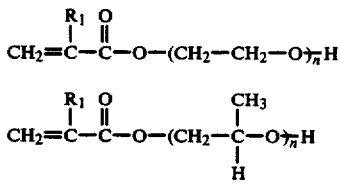

in which n=2 to 25, and $R_1$ represents a hydrogen atom or a methyl group;

(4) Bis-Phenol A derivatives represented by the following formula:

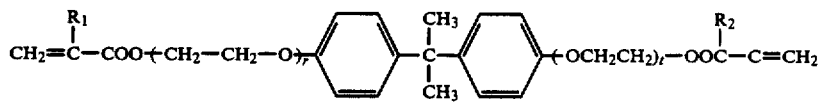

wherein $R_1$ and $R_2$ independently from each other, represent a hydrogen, chlorine or bromine atom or a methyl group, and r and t, independently from each other, is 0, 1, 2, or 3;

(5) Copolymers having a molecular weight of 1,000 to 20,000 formed from:
at least one allyl ester of an α-β unsaturated carboxylic acid or an allyl substituted monovinyl aromatic compound, and
at least one lower alkyl methacrylate;

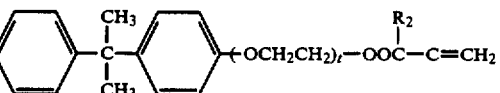

wherein R1 represents a hydrogen atom or a methyl group, n is 0, 1, 2, or 3, and R2 is a monovalent aliphatic hydrocarbon group of 7-30 carbon atoms containing a plurality of alicyclic rings which form a fused ring having at least two ring members in common.

11. A coating composition in accordance with claim 1, the components of said composition being present in the following percentages by weight:

| Component a | 48-64 |
|---|---|
| Component b | 19.6-32 |

| -continued | |
|---|---|
| Component c | 15-22 |
wherein component c contains a member selected from isobornyl acrylate; and norbornyl acrylates and methacrylates of the formula:
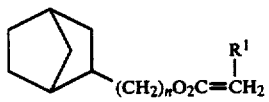
in which $R_1$ represents H or $CH_3$ and n is 0 or 1, in an amount to constitute 5–12% by weight of the composition.
* * * * *

UNITED STATES PATENT AND TRADEMARK OFFICE
CERTIFICATE OF CORRECTION

PATENT NO. : 4,954,591

DATED : September 4, 1990

INVENTOR(S) : Hector Belmares

It is certified that error appears in the above-identified patent and that said Letters Patent is hereby corrected as shown below:

At column 16, line 68, through column 17, line 2, please delete the following from claim 1, subsection (c):

"or 3-30% of an unsaturated monomer having a Tg less than 80°C."

Signed and Sealed this

First Day of December, 1992

*Attest:*

DOUGLAS B. COMER

*Attesting Officer*  Acting Commissioner of Patents and Trademarks

UNITED STATES PATENT AND TRADEMARK OFFICE
CERTIFICATE OF CORRECTION

PATENT NO. : 4,954,591
DATED : September 4, 1990
INVENTOR(S) : Hector Belmares

It is certified that error appears in the above-indentified patent and that said Letters Patent is hereby corrected as shown below:

In claim 10 at column 18, line 3, the formula should read:

$$R_1-O-(O-CH_2-CH_2-)_n-OR_2$$

and at blank line 47, the following should appear:

(6) Monomers represented by the formula:

Signed and Sealed this

Twentieth Day of December, 1994

Attest:

BRUCE LEHMAN

*Attesting Officer*  *Commissioner of Patents and Trademarks*